United States Patent
Kubota et al.

(10) Patent No.: US 11,661,667 B2
(45) Date of Patent: May 30, 2023

(54) ANTI-CORROSION TERMINAL MATERIAL, ANTI-CORROSION TERMINAL AND ELECTRIC WIRE END STRUCTURE

(71) Applicant: MITSUBISHI MATERIALS CORPORATION, Tokyo (JP)

(72) Inventors: Kenji Kubota, Naka (JP); Yoshie Tarutani, Naka (JP); Takashi Tamagawa, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 462 days.

(21) Appl. No.: 16/759,790

(22) PCT Filed: Oct. 25, 2018

(86) PCT No.: PCT/JP2018/039680
§ 371 (c)(1),
(2) Date: Apr. 28, 2020

(87) PCT Pub. No.: WO2019/087926
PCT Pub. Date: May 9, 2019

(65) Prior Publication Data
US 2021/0184380 A1    Jun. 17, 2021

(30) Foreign Application Priority Data
Oct. 30, 2017   (JP) .............................. JP2017-208844

(51) Int. Cl.
B32B 15/01     (2006.01)
C25D 5/00      (2006.01)
(Continued)

(52) U.S. Cl.
CPC .............. *C25D 5/617* (2020.08); *B32B 15/01* (2013.01); *C25D 3/12* (2013.01); *C25D 3/22* (2013.01);
(Continued)

(58) Field of Classification Search
None
See application file for complete search history.

(56) References Cited

U.S. PATENT DOCUMENTS

| 8,940,404 B2 | 1/2015 | Taninouchi et al. |
| 2001/0008709 A1 | 7/2001 | Asakura et al. |

(Continued)

FOREIGN PATENT DOCUMENTS

| EP | 3012919 A1 | 4/2016 |
| EP | 3382814 A1 | 10/2018 |

(Continued)

OTHER PUBLICATIONS

Supplementary European Search Report dated Sep. 15, 2021, issued for European Patent Application No. 18872594.9.
(Continued)

*Primary Examiner* — Daniel J. Schleis
(74) *Attorney, Agent, or Firm* — Locke Lord LLP

(57) ABSTRACT

An anti-corrosion terminal material including a base material made of copper or copper alloy and a coating film laminated on the base material: the coating film includes: a first coating film, provided with a zinc layer made of zinc alloy and a tin layer made of tin or tin alloy which are laminated in this order, and formed at a planned core contact part; and a second coating film including the tin layer but not comprising the zinc layer, which is provided at a planned contact part being a contact part when the terminal is formed: and the zinc layer has a thickness not less than 0.1 μm and not more than 5.0 μm and zinc concentration not less (Continued)

than 30% by mass and not more than 95% by mass, and has any one or more of nickel, iron, manganese, molybdenum, cobalt, cadmium, lead and tin as a balance.

19 Claims, 4 Drawing Sheets

(51) Int. Cl.
- *C25D 3/12* (2006.01)
- *C25D 3/22* (2006.01)
- *C25D 3/30* (2006.01)
- *C25D 7/00* (2006.01)
- *H01R 4/18* (2006.01)
- *H01R 12/69* (2011.01)
- *H01R 13/03* (2006.01)
- *C25D 5/12* (2006.01)

(52) U.S. Cl.
CPC .............. *C25D 3/30* (2013.01); *C25D 5/12* (2013.01); *C25D 7/00* (2013.01); *H01R 4/18* (2013.01); *H01R 12/69* (2013.01); *H01R 13/03* (2013.01); *B32B 2311/20* (2013.01)

(56) References Cited

U.S. PATENT DOCUMENTS

| | | |
|---|---|---|
| 2016/0064847 A1 | 3/2016 | Gaertner |
| 2016/0336662 A1 | 11/2016 | Ooba |
| 2016/0365648 A1 | 12/2016 | Aoki |
| 2017/0342571 A1 | 11/2017 | Gaertner |
| 2018/0347062 A1 | 12/2018 | Kubota et al. |
| 2020/0259274 A1 | 8/2020 | Kubota et al. |

FOREIGN PATENT DOCUMENTS

| | | |
|---|---|---|
| JP | S56-41397 A | 4/1981 |
| JP | H10-134869 A | 5/1998 |
| JP | 2008-285729 A | 11/2008 |
| JP | 2013-218866 A | 10/2013 |
| JP | 2015-133306 A | 7/2015 |
| JP | 2015-141784 A | 8/2015 |
| JP | 2016-518528 A | 6/2016 |
| JP | 2016-169439 A | 9/2016 |
| JP | 2017-110290 A | 6/2017 |
| TW | 201732839 A | 9/2017 |
| WO | 2017/090638 A1 | 6/2017 |

OTHER PUBLICATIONS

International Search Report dated Dec. 18, 2018, issued for PCT/JP2018/039680.

ANTI-CORROSION TERMINAL MATERIAL, ANTI-CORROSION TERMINAL AND ELECTRIC WIRE END STRUCTURE

BACKGROUND OF THE INVENTION

Technical Field

The present invention relates to an anti-corrosion terminal material having high anti-corrosion effect, used for a terminal which is crimped to an end of an electric wire made of an aluminum wire material, an anti-corrosion terminal made of the anti-corrosion terminal material, and an electric wire end structure using the anti-corrosion terminal.

Priority is claimed on Japanese Patent Application No. 2017-208844, filed Oct. 30, 2017, the content of which is incorporated herein by reference.

Background Art

Usually, a terminal formed of copper or copper alloy is crimped to an end part of an electric wire formed of copper or copper alloy; and this terminal is connected to a terminal provided with a device: so that the electric wire is connected to the device. There is a case in which a core of the electric wire is formed of aluminum or aluminum alloy in place of copper or copper alloy in order to reduce a weight of the electric wire, and the like.

For example, in Patent Document 1, disclosed is an electric wire with a terminal, provided with an electric wire in which a core made of a stranded wire formed by stranding element wires made of aluminum or aluminum alloy is coated with an insulation cover, and a terminal having a connection part, to which the core exposed by peeling the insulation cover at an end of the electric wire is electrically connected.

Contact corrosion between dissimilar metals (galvanic corrosion) owing to potential difference of the dissimilar metals may occur when water enters in a crimping part of the terminal and the electric wire, if the electric wire (a conductive wire) is made of aluminum or aluminum alloy and the terminal is made of copper or copper alloy. Therefore, as a result of the corrosion of the electric wire, electric resistance may rise or a crimping force may be reduced at the crimping part.

For example, Patent Documents 1 to 3 describe prevention methods of such corrosion between the dissimilar metals.

Patent Document 1 describes a terminal in which an anti-corrosion layer made of metal having a sacrificial anti-corrosive action for a base material layer is formed between the base material layer made of iron or iron alloy and a tin layer formed on an outermost side. Patent Document 1 also describes that the anti-corrosion layer is a layer formed of zinc or zinc alloy.

Patent Document 2 discloses an electric contact material for connectors having a base material made of metal material, an alloy layer formed on the base material, and a conductive film layer formed on a surface of the alloy layer. In the electric contact material for connectors of Patent Document 2, the alloy layer essentially contains Sn and contains one or two or more additive elements selected from Cu, Zn, Co, Ni and Pd; and the conductive film layer contains $Sn_3O_2(OH)_2$ (hydroxide oxide). Patent Document 2 describes that durability under high-temperature environment is improved owing to the conductive film layer containing $Sn_3O_2(OH)_2$, so it is possible to maintain low contact resistance for long term.

Patent Document 3 discloses an Sn-plated material having an undercoat Ni-plated layer, an intermediate SnCu-plated layer, and a surface Sn-plated layer in this order on a surface of copper or copper alloy. In this Sn-plated material: the undercoat Ni-plated layer is formed of Ni or Ni alloy; the intermediate Sn—Cu plated layer is formed of Sn—Cu type alloy in which an Sn—Cu—Zn alloy layer is formed at at least a side being in contact with the surface Sn-plated layer; and the surface Sn-plated layer is formed of Sn alloy containing Zn 5 to 1000 ppm by mass: and a Zn high-concentration layer in which Zn concentration is more than 0.1% by mass to 10% by mass is provided on an outermost surface.

CITATION LIST

Patent Document 1: Japanese Unexamined Patent Application, First Publication No. 2013-218866
Patent Document 2: Japanese Unexamined Patent Application, First Publication No. 2015-133306
Patent Document 3: Japanese Unexamined Patent Application, First Publication No. 2008-285729

SUMMARY OF INVENTION

Technical Problem

However, as described in Patent Document 1, in a case in which the anti-corrosion layer made of zinc or zinc alloy is provided as an undercoat, there is a problem in that adhesiveness between the anti-corrosion layer and a tin layer is deteriorated by Sn substitution when the tin layer is formed by performing Sn plating on the anti-corrosion layer. As described in Patent Document 2, even in a case of a conductive film layer including $Sn_3O_2(OH)_2$ is provided, there is a problem in that the durability is low because vacancies occur in hydroxide oxide when exposed in corrosive environment or heating environment. As described in Patent Document 3, if the Sn—Zn alloy is laminated on the Sn—Cu type alloy layer and the Zn high-concentration layer is provided on the outermost layer, productivity of Sn—Zn alloy plating is low, and there is a problem in that an anti-corrosion effect to aluminum wire material is lost when copper (Cu) is exposed on the surface layer from the Sn—Cu alloy layer.

The present invention is achieved in consideration of the above circumstances, and has an object, as terminals crimped to an end of an electric wire made of aluminum wire material, to provide an anti-corrosion terminal material with a high anti-corrosion effect using copper or copper alloy base material, an anti-corrosion terminal made of the anti-corrosion terminal material and an electric wire end structure using the anti-corrosion terminal.

Solution to Problem

An anti-corrosion terminal material of the present invention includes a base material made of copper or copper alloy and a coating film laminated on the base material: in the anti-corrosion terminal, the coating film includes: a first coating film which is provided with a zinc layer made of zinc or alloy and a tin layer made of tin or tin alloy which are laminated in this order, and formed at a planned core contact part in which a core of an electric wire is in contact with when a terminal is formed; and a second coating film which includes the tin layer but not includes the zinc layer, and is provided at a planned contact part being a contact part when the terminal is formed: and in the anti-corrosion terminal material, the zinc layer has a thickness not less than 0.1 μm and not more than 5.0 μm and zinc concentration not less than 30% by mass and not more than 95% by mass, and has any one or more of nickel, iron, manganese, molybdenum, cobalt, cadmium, lead and tin as a balance.

In this anti-corrosion terminal material, the first coating film of the planned core contact part is formed by laminating the zinc layer and the tin layer: and zinc in the zinc layer is diffused in the tin layer. Accordingly, corrosion potential of the tin layer at the planned core contact part is near to aluminum, so that galvanic corrosion (contact corrosion by dissimilar metals) in a case of being in contact with aluminum wire material can be prevented from occurring. Moreover, the first coating film has the zinc layer as an undercoat of the tin layer: even if an entire or a part of the tin layer is lost by abrasion or the like, the zinc layer thereunder can prevent the contact corrosion of the dissimilar metals, so that it is possible to restrain an electric resistance value from increasing and a crimping force on the aluminum wire material from deteriorating.

The zinc layer is zinc alloy containing any one or more of nickel, iron, manganese, molybdenum, cobalt, cadmium, lead and tin: so it is possible to improve an anti-corrosion property of the zinc layer itself while preventing excessive diffusion of zinc. Accordingly, even if the tin layer is exposed in the corrosive environment and lost, it is possible to maintain the zinc layer for long term and possible to prevent the corrosion current from increasing. Nickel zinc alloy or tin zinc alloy is especially preferable since an effect of improving the anti-corrosion property of the zinc layer is high.

If the zinc concentration of the zinc layer is less than 30% by mass, the anti-corrosion property of the zinc layer is deteriorated, so that the zinc layer is instantly corroded and disappeared by being exposed in corrosive environment such as salt water: as a result, the base material is exposed and corrosion is easily occurred between the aluminum wire material. By contrast, if the zinc concentration of the zinc layer is more than 95% by mass, zinc excessively is diffused to the tin layer, so that the contact resistance is increased between the aluminum wire material and the terminal.

If the thickness of the zinc layer is less than 0.1 μm, there is no effect of lowering the corrosion potential at the surface of the first coating film (the tin layer): if the thickness is more than 5.0 μm, press workability is deteriorated, so breakages may be generated when press machining into the terminal. The thickness of the zinc layer is preferably not less than 0.3 μm and not more than 2.0 μm.

By contrast, the zinc layer is not provided under the tin layer in the second coating film of the planned contact part. If zinc exists on the surface of the tin layer, connection reliability of a contact may be deteriorated under high-temperature and high-humidity environment. Accordingly, the second coating film of the planned contact part has a structure of not having the zinc layer, so that it is possible to restrain the contact resistance from rising even when exposed in the high-temperature and high-humidity environment.

In the anti-corrosion terminal material of the present invention, it is preferable that a proportion of an area of the zinc layer to a surface after the terminal is formed be not less than 30% and not more than 80%.

It is necessary for the zinc layer not to exist on the planned contact part but to exist on the planned core contact part. In the other pats than the planned contact part and the planned core contact part, it is not necessary for the zinc layer to exist: however, it is desirable that the proportion of the part in which the zinc layer exists is higher; preferably the proportion of the area to the entire surface of the base material is not less than 30% and not more than 80%.

In the anti-corrosion terminal material, it is preferable that a mean crystal grain size of tin or tin alloy in the tin layer of the first coating film be not less than 0.5 μm and not more than 8.0 μm.

Zinc in the tin layer of the first coating film is diffused into the tin layer from the zinc layer by forming the tin layer, by means of forming the zinc layer by zinc alloy plating on the base material, then tin plating, and carrying out a diffusion treatment and the like. Since zinc is diffused into the tin layer through crystal boundaries of tin, a diffusion amount of zinc increases and the anti-corrosion effect is improved if the mean crystal grain size of tin or tin alloy in the tin layer is minute: moreover, even when it is exposed in the corrosive environment and the zinc concentration in tin is reduced, zinc is continuously supplied so as to have high durability.

However, if the mean crystal grain size of tin or tin alloy in the tin layer is less than 0.5 μm, a density of grain boundaries is too high and zinc is diffused excessively, so that the anti-corrosion property of the tin layer is deteriorate. Accordingly, the tin layer may be corroded when exposed in the corrosive environment, and the contact resistance to the aluminum wire material may be deteriorated (risen). By contrast, if the mean crystal grain size of tin or tin alloy in the tin layer is more than 8.0 μm, the diffusion of zinc is not enough, and the effect of preventing corrosion of the aluminum wire material is poor. It is preferable that the mean crystal grain size of tin or tin alloy in the tin layer of the first coating film be not less than 1.2 μm and not more than 3.0 μm.

In the anti-corrosion terminal material of the present embodiment, it is preferable that at the planned core contact part, the tin layer of the first coating film have a thickness not less than 0.8 μm and not more than 6.0 μm and made of tin alloy having zinc concentration not less than 0.4% by mass and not more than 15% by mass.

If the thickness of the tin layer of the first coating film is less than 0.8 μm, the thickness of the tin layer is too thin, so that the solder wettability may be deteriorated and the contact resistance may be increased. By contrast, if the thickness of the tin layer of the first coating film is more than 6.0 μm, the thickness of the tin layer is too thick, so that it may cause an increase of the dynamic friction coefficient on a surface, and a mount/dismount resistance in using of connectors or the like tends to be increased.

As described above, if the tin layer of the first coating film contains zinc, there is an effect of preventing corrosion of the aluminum wire material by lowering the corrosion potential: however, if a zinc concentration thereof is less than 0.4% by mass, the effect of preventing the corrosion of the aluminum wire material by lowering the corrosion potential is poor; if it is more than 15% by mass, the corrosion resistance property of the tin layer is remarkably deteriorated and the tin layer is corroded when exposed in the corrosive environment, so that the contact resistance between the first coating film and the aluminum wire material may be deteriorated. In a case in which the thickness of the tin layer of the first coating film is not less than 0.8 μm and not more than 6.0 μm, it is preferable that a zinc concentration of the tin layer of the first coating film be not less than 0.6% by mass and not more than 6.0% by mass.

In the anti-corrosion terminal material of the present invention, it is preferable that an undercoat layer made of nickel or nickel alloy be provided between the base material and the coating film.

The undercoat layer between the base material and the coating film has an effect of restraining the contact resistance from increasing resulting from diffusion of copper from the base material to a surface of the coating film when a thermal load is applied.

In the anti-corrosion terminal material of the present invention, it is preferable to include a carrier part having a belt-shape; and terminal members connected with an interval therebetween along a length direction of the carrier part and provided with the planned core contact part and the planned contact part.

An anti-corrosion terminal of the present invention is a terminal formed of the above-described anti-corrosion terminal material. In an electric wire end structure of the present invention, the anti-corrosion terminal is crimped to an end of an electric wire formed of aluminum wire material made of aluminum or aluminum alloy.

Advantageous Effects of Invention

According to the present invention, the anti-corrosion effect on the electric wire made of aluminum can be improved since the tin layer of the first coating film at the planned core contact part contains zinc. Moreover, since zinc is diffused to the surface of the tin layer from the zinc layer under the tin layer of the first coating film, the zinc layer can be maintained with high concentration, so that the durability is superior for long term. Furthermore, even if an entire or a part of the tin layer is lost by abrasion or the like, it is possible to prevent the contact corrosion of dissimilar metals by the zinc layer thereunder, and it is possible to restrain the increase of the electric resistance value and the deterioration of the crimping force on the aluminum wire material. By contrast, since the planned contact part does not have the zinc layer, it is possible to restrain the increase of the contact resistance at the contact owing to deposits of the corrosion of zinc even when it is exposed in high-temperature and high-humidity environment.

DESCRIPTION OF EMBODIMENTS

An anti-corrosion terminal material, an anti-corrosion terminal and an electric wire end structure according to an embodiment of the present invention will be explained.

Figure 2:
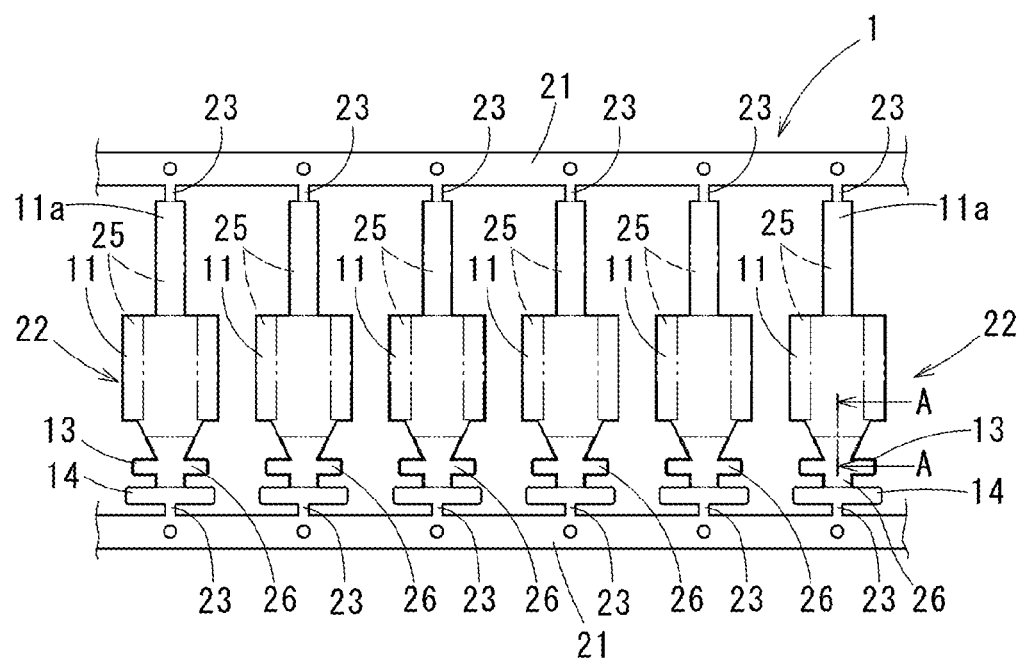
FIG. 2 It is a plan view of the anti-corrosion terminal material of the embodiment.

An anti-corrosion terminal material 1 of the present embodiment is, as entirely shown in FIG. 2, a strip material formed in a belt-shape for forming terminals: between a pair of belt-shaped carrier parts 21 extending in a parallel manner, terminal members 22 to be formed into terminals are disposed with intervals in a longitudinal direction of the carrier parts 21; the respective terminal members 22 are connected to both the carrier parts 21 with narrow connecting parts 23 therebetween. The terminal members 22 are formed to have a shape shown in FIG. 3 for instance, and finished as anti-corrosion terminals 10 (refer to FIG. 4) by being cut off from the connecting parts 23.

Figure 3:
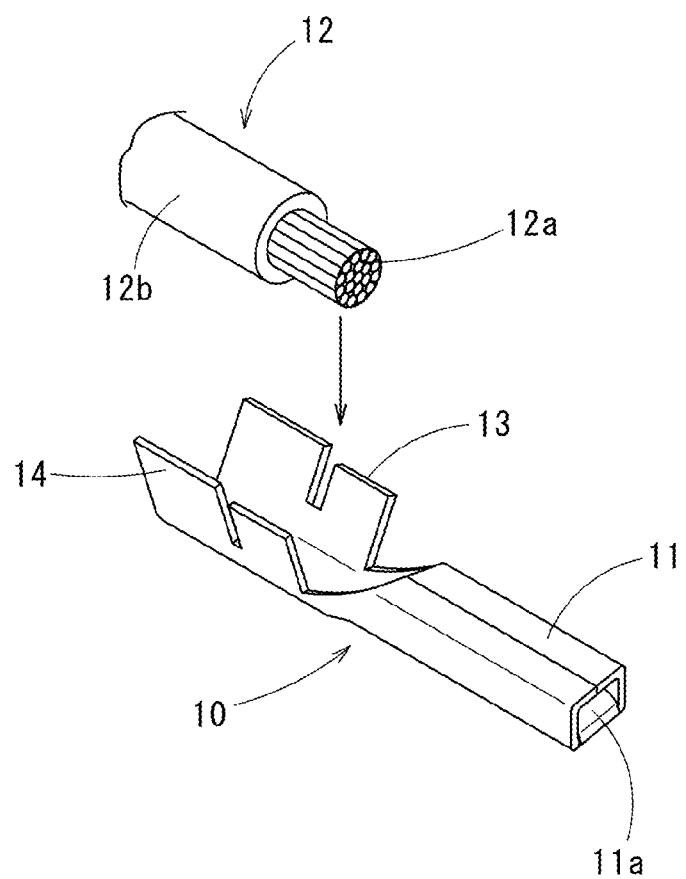
FIG. 3 It is a perspective view showing an example of an anti-corrosion terminal on which the anti-corrosion terminal material of the embodiment is applied.

In the anti-corrosion terminal material 10 (an example in FIG. 3 is a female terminal), a coupling part 11 to which a male terminal 15 (refer to FIG. 4) is fit-inserted, a core-crimping part 13 to which an exposed core (an aluminum wire material) 12a of an electric wire 12 is crimped, and a cover-crimping part 14 to which a cover part 12b of the electric wire 12 is crimped are arranged in this order from a tip and formed integrally. The coupling part 11 is formed into a square tube shape: a spring tab 11a which is connected to a tip of the coupling part 11 is inserted inside the coupling part 11 so as to be folded (refer to FIG. 4).

Figure 4:
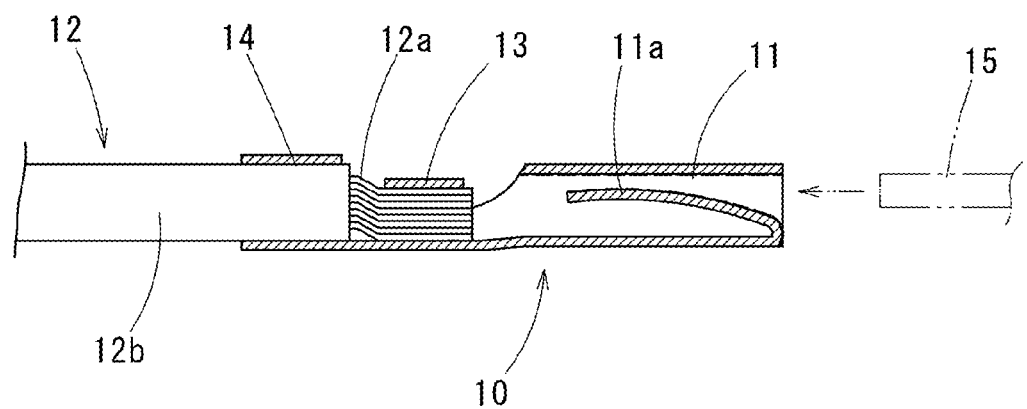
FIG. 4 It is a frontal view showing an electric wire end structure in which the anti-corrosion terminal of FIG. 3 is crimped to an end part of an electric wire.

FIG. 4 shows a terminal end part structure in which the anti-corrosion terminal 10 is crimped to the electric wire 12. In this electric wire end structure, the vicinity of the core-crimping part 13 is directly in contact with the core 12a of the electric wire 12.

In the strip material shown in FIG. 2, when it is formed into the anti-corrosion terminals 10, a part which will be a contact which forms the coupling part 11 and will be in contact with the male terminal 15 is a planned contact part 25, and a surface of a part with which the core 12a is in contact in the vicinity of the core crimping part 13 is a planned core contact part 26.

In this case, when the female terminal 10 of the embodiment is formed, the planned contact parts 25 are an inner surface of the coupling part 11 formed into the square tube shape and a surface facing to the spring tab 11a folded inside the coupling part 11. In a state in which the coupling part 11 is expanded as shown in FIG. 2, surfaces at both sides of the coupling part 11 and a back surface of the spring tab 11a are the planned contact parts 25.

Figure 1:
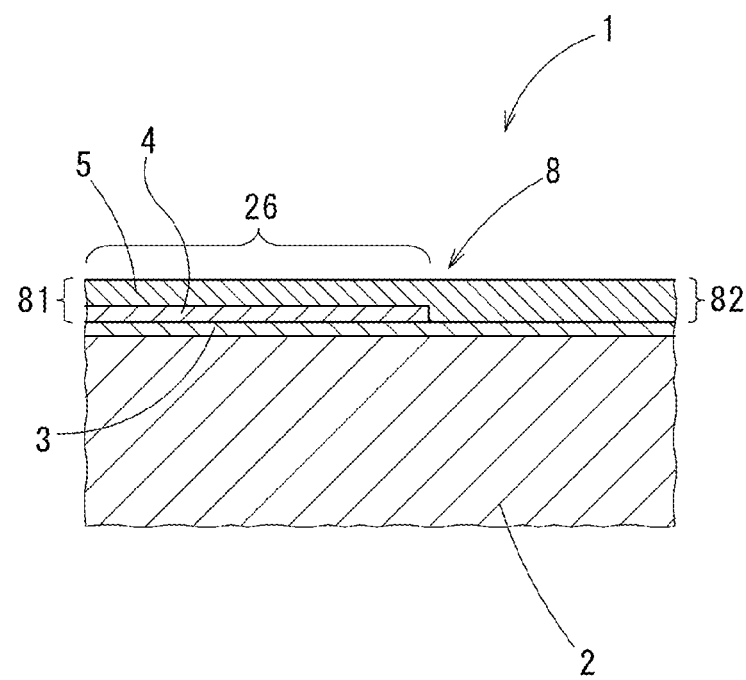
FIG. 1 It is a cross sectional view of an essential part schematically showing an anti-corrosion terminal material according to an embodiment of the present invention.

In the anti-corrosion terminal material 1, as FIG. 1 schematically showing a cross section (corresponding to a cross section taken along the line A-A in FIG. 2), a coating film 8 is formed on a base material 2 made of copper or copper alloy, and an undercoat layer 3 made of nickel or nickel alloy is formed between the base material 2 and the coating film 8.

The coating film 8 is consist of a first coating film 81 formed on a surface of the planned core contact part 26 and a second coating film 82 formed on surface of parts except for the planned core contact part 26. In the first coating film 81, a zinc layer 4 made of zinc alloy and a tin layer 5 made of tin or tin alloy are laminated in this order on the base material 2.

In the second coating film 82 formed on the surface of the planned contact parts 25, only the tin layer 5 is laminated but the zinc layer 4 is not provided. It is preferable for the zinc layer 4 to exist with an area proportion not less than 30% and not more than 80% of a surface of the terminal 10 after forming (a surface of the terminal member 22).

The base material 2 is not specifically limited in a composition thereof, if it is made of copper or copper alloy.

The undercoat layer 3 has a thickness not less than 0.1 μm and not more than 5.0 μm and a nickel content percentage not less than 80% by mass. The undercoat layer 3 has a function of preventing diffusion of copper from the base material 2 to the zinc layer 4 and the tin layer 5. If the thickness of the undercoat layer 3 is less than 0.1 μm, an effect of preventing the diffusion of copper is poor: if it is more than 5.0 μm, breakages are easy to occur while press machining. The thickness of the undercoat layer 3 is more preferably not less than 0.3 μm and not more than 2.0 μm.

If the nickel content percentage is less than 80% by mass, the effect of preventing the diffusion of copper to the zinc layer 4 and the tin layer 5 is poor. The nickel content percentage is more preferably not less than 90% by mass.

Next, the first coating film 81 formed on the surface of the parts excluding the planned contact parts 25 (parts including the planned core contact part 26) will be explained.

As described above, the first coating film 81 is formed by laminating the zinc layer 4 and the tin layer 5, and zinc in the zinc layer 4 is diffused in the tin layer 5. Therefore, the tin layer 5 of the first coating film 81 has a corrosion potential near to that of aluminum, so it is possible to prevent the corrosion when it is in contact with the aluminum wire material.

The zinc layer 4 has a thickness not less than 0.1 μm and not more than 5.0 μm and is made of zinc alloy containing zinc. The zinc layer 4 contains a zinc with a concentration not less than 30% by mass and not more than 95% by mass, and a balance including one or more of nickel, iron, manganese, molybdenum, cobalt, cadmium, lead and tin.

Nickel, iron, manganese, molybdenum, cobalt, cadmium, lead and tin are preferable to improve an anti-corrosion property of the zinc layer 4 itself: by forming the zinc layer 4 from zinc alloy containing one or more of these, it is possible to maintain the zinc layer for long term even when the tin layer 5 is lost by being exposed in excessive corrosive environment, and the corrosion current can be prevented from increasing.

In addition, nickel zinc alloy and tin zinc alloy has high effect of improving the anti-corrosion property of the zinc layer 4: it is especially preferable that the zinc layer 4 be made of zinc alloy containing one or more of nickel or tin. As described above, the zinc concentration of the zinc layer 4 is not less than 30% by mass and not more than 95% by mass: additives consisting of any one or more of nickel, iron, manganese, molybdenum, cobalt, cadmium, lead, and tin is contained with not less than 5% by mass in the zinc layer 4.

If the zinc concentration of the zinc layer 4 is less than 30% by mass, the anti-corrosion property of the zinc layer 4 is deteriorated; and the zinc layer 4 is corroded and lost rapidly and the base material 2 is exposed if the zinc layer 4 is exposed in the corrosive environment such as salt water, so it is easy to be corroded with the core (the aluminum wire material) 12a. The zinc concentration of the zinc layer 4 is more preferably not less than 65% by mass. By contrast, if the zinc concentration of the zinc layer 4 is more than 95% by mass, zinc is excessively diffused to the tin layer 5, so that the contact resistance between the core 12a and the terminal 10 is increased.

If the thickness of the zinc layer 4 is less than 0.1 μm, the effect of lowering the corrosion potential at the surface of the first coating film 81 (the tin layer 5) is poor: if it is more than 5.0 μm, press machinability is deteriorated and the breakages may occur when the press machining into the terminals 10 is performed. It is more preferable that the thickness of the zinc layer 4 be not less than 0.3 μm and not more than 2.0 μm.

The tin layer 5 of the first coating film 81 has a zinc concentration not less than 0.4% by mass and not more than 15% by mass. As described above, if the tin layer 5 of the first coating film 81 contains zinc, there is an effect of preventing corrosion of the core 12a made of aluminum by lowering the corrosion potential: however, if the zinc concentration of the tin layer 5 is less than 0.4% by mass, the effect of preventing the corrosion of the core 12a by lowering the corrosion potential is poor; and if it is more than 15% by mass, the anti-corrosion property of the tin layer 5 is remarkably deteriorated and the tin layer 5 is corroded by being exposed in the corrosion environment, and the contact resistance between the first coating film 81 and the core 12a may be deteriorated. It is preferable for the tin layer 5 of the first coating film 81 that the zinc concentration be not less than 0.6% by mass and not more than 6.0% by mass in a case in which the thickness is not less than 0.8 μm and not more than 6.0 μm.

It is preferable that the thickness of the tin layer 5 of the first coating film 81 be not less than 0.8 μm and not more than 6.0 μm. If the thickness of the tin layer 5 is less than 0.8 μm, the thickness of the tin layer 5 is too thin, so that solder wettability is deteriorated and it may cause deterioration of the contact resistance. By contrast, if the thickness of the tin layer 5 is more than 6.0 μm, the thickness of the tin layer 5 is too thick, so it may cause increase of dynamic friction coefficient on a surface of the first coating film 81, and mount/dismount resistance is tend to be large at the planned core contact part 26 for use as a connector or the like.

It is preferable that a mean crystal grain size of tin or tin alloy in the tin layer 5 of the first coating film 81 be not less than 0.5 μm and not more than 8.0 μm; specially, not less than 1.2 μm and not more than 3.0 μm. Zinc in the tin layer 5 of the first coating film 81 is dispersed (diffused) into the tin layer 5 from the zinc layer 4 through tin-crystal grain boundaries: if the mean crystal grain size of tin or tin alloy in the tin layer 5 is minute (the mean crystal grain size is not less than 0.5 μm and not more than 8.0 μm), a diffusion amount of zinc is increased and the anti-corrosion effect can be increased. Moreover, since zinc is continuously supplied even when being exposed in the corrosive environment and the zinc concentration in the tin layer 5 is decreased, durability of the anti-corrosion effect can be improved.

If the mean crystal grain size of tin or tin alloy in the tin layer 5 is less than 0.5 μm, a density of grain boundaries is too high and the diffusion of zinc is excessive, and the anti-corrosion property of the tin layer 5 is deteriorated. Accordingly, the tin layer 5 is corroded when exposed in the corrosion environment, and the contact resistance with the core 12a may be deteriorated (increased). By contrast, if the mean crystal grain size of tin or tin alloy in the tin layer 5 is more than 8.0 μm, the diffusion of zinc is not enough, and the effect of preventing the core 12a from corrosion may be poor.

The first coating film 81 having the above layered structure exists on a surface of parts except for the planned contact parts 25 as described above. As described above, it is necessary for the first coating film 81 having the zinc layer 4 to exist on the planned core contact parts 26 which are in contact with the core 12a made of aluminum: however, the zinc layer 4 is not necessary to exist on the other parts. Nevertheless, it is preferable that a proportion of parts in which the zinc layer 4 exists be higher since corrosion current flows from separated parts in galvanic corrosion (contact corrosion between dissimilar metals): it is preferable that the zinc layer 4 exists at an area proportion not less than 30% and not more than 80% of an entire surface when it is formed as the terminal 10.

In the second coating film 82 formed on the planned contact parts 25, only the tin layer 5 exists but the zinc layer 4 is not included. If zinc exists on a surface of the tin layer 5 of the second coating film 82, corrosion products of zinc are piled up under high-temperature and high-humidity environment, the connection reliability as a contact may be deteriorated. Accordingly, by a structure of not having the zinc layer 4 on the second coating film 82 of the planned contact part 25, it is possible to prevent the increase of the contact resistance even when it is exposed in the high-temperature and high-humidity environment. In addition, composition, a film thickness and the like of the undercoat layer 3 provided between the base material 2 and the second coating film 82 are the same as those forming the undercoat layer 3 formed between the base material 2 and the first coating film 81 existing on the surface of the parts except for the planned contact part 25.

Although the tin layer 5 of the first coating film 81 and the second coating film 82 is most preferably pure tin; it may be tin alloy containing zinc, nickel, copper and the like is applicable.

In addition, on the surface of the first coating film 81 and the second coating film 82, i.e., on the surface of the tin layer 5, an oxide layer of zinc or tin is generated.

Next, a method of manufacturing the anti-corrosion terminal material 1 will be explained.

As the base material 2, a board material made of copper or copper alloy is prepared. By performing machining of cutting, drilling and the like, a strip material in which the terminal members 22 are connected to the carrier parts 21 by the connecting parts 23 is formed as shown in FIG. 2.

After cleaning the surface by performing degreasing, pickling and the like on the strip material, then nickel or nickel alloy plating is performed on the entire surface for forming the undercoat layer 3. After that, the planned contact parts 25 are covered by masks (not illustrated); zinc alloy plating for forming the zinc layer 4 is performed in the state; the masks are removed; and performed is tin or tin alloy plating for forming the tin layer 5 on the entire surface.

The nickel or nickel alloy plating for forming the undercoat layer 3 on the surface of the base material 2 is not specifically limited if a dense film mainly made of nickel can be obtained: it can be formed by electroplating using a known Watt bath, a sulfamic acid bath, a citric acid bath, and the like. For the nickel alloy plating, nickel tungsten alloy (Ni—W), nickel phosphorus alloy (Ni—P), nickel cobalt alloy (Ni—Co), nickel chromium alloy (Ni—Cr), nickel iron alloy (NiFe), nickel zinc alloy (Ni—Zn), nickel boron alloy (Ni—B) and the like can be used.

Considering the press bendability of the anti-corrosion terminal 10 and the barrier property against copper, pure nickel plating which can be obtained by the sulfamic acid bath is desirable.

The method of forming the zinc layer 4 is not specifically limited; nevertheless, it is preferable to use an electroplating method from a viewpoint of productivity. The zinc alloy plating is not specifically limited if a dense film can be obtained with a desired composition; a known sulfate bath, a chloride bath, a zincate bath or the like can be used. For zinc alloy plating, a complexing agent bath containing citric acid can be used for zinc tin alloy plating; a sulfate bath, a chloride bath, an alkaline bath can be used for zinc nickel alloy plating; a sulfate bath can be used for zinc cobalt alloy plating; a chloride bath containing citric acid can be used for zinc manganese alloy plating; and a chloride bath can be used for zinc molybdenum plating: thereby a film can be formed. Although illustration is omitted, the planned contact parts 25 are covered by a mask such as a masking tape, the parts except for the planned contact parts 25 are plated. Other than plating methods, an evaporation method can be used.

Tin or tin alloy plating for forming the tin layer 5 can be performed by known methods: nevertheless, in order to control the mean crystal grain size of tin or tin alloy in the tin layer 5 to be an optimal value, the electroplating can be performed by using an acid bath, for example, such as an organic acid bath (e.g., a phenol sulfonic acid bath, an alkane sulfonic acid bath or an alkanol-sulfonic acid bath), a fluoroboric bath, a halogen bath, a sulfate bath, a pyrophosphoric acid bath or the like, or an alkaline bath such as a potassium bath, a sodium bath or the like. Although omitting to illustrate, tin or tin alloy plating is performed on the entire surface including the planned contact parts 25 and the planned core contact parts 26 with removing the masks on the planned contact parts 25.

In order to control the mean crystal grain size of tin or tin alloy in the tin layer 5 to not more than 0.8 μm, preferably, as additives reducing the mean crystal grain size, added are: aldehydes such as formaldehyde, benzaldehyde, naphthaldehyde and the like, unsaturated hydrocarbon compounds such as methacrylic acid, acrylic acid, and the like.

In order to advance mutual diffusion between the zinc layer 4 and the tin layer 5 at normal temperature (25° C.), it is important to pile a tin plating layer after cleaning a surface of a zinc plating layer. Since hydroxide oxide and oxide are rapidly generated on the surface of the zinc plating layer: to continuously form films by plating, it is preferable to cleanse it by sodium hydroxide aqueous solution or ammonium chloride aqueous solution to remove hydroxide and oxide and immediately form a film of the tin plating layer. In addition, when forming the tin layer by a dry method such as the evaporation, it is preferable to etch the surface of the zinc layer by argon sputtering before forming the tin layer.

As above mentioned, carried out are nickel or nickel alloy plating, zinc alloy plating and tin or tin alloy plating on the base material 2 in this order, then a heat treatment is carried out.

In this heat treatment, material is heated at temperature in which a surface temperature be not less than 30° C. and not more than 190° C. By this heat treatment, zinc in the zinc plating layer is diffused into the tin plating layer and on the tin plating layer at parts except for the planned contact parts 25. Since zinc is diffused immediately, it is preferable to be exposed at temperature not less than 30° C. for 24 hours or longer. Nevertheless, it is not heated to temperature higher than 190° C., because zinc alloy repels melted tin and tin-repelled parts are generated on the tin layer 5. Moreover, if it is exposed for long time at higher than 160° C., contrarily tin is diffused to the zinc layer 4, so that zinc may be impeded to be diffused to the tin layer 5. Accordingly, more preferable condition is the heating temperature not less than 30° C. and not more than 160° C. and the heating time not less than 30 minutes and not more than 60 minutes.

In the anti-corrosion terminal material 1 manufactured as above, overall, the undercoat layer 3 made of nickel or nickel alloy is formed on the base material 2, the tin layer 5 is formed on the undercoat layer 3 at the planned contact parts 25 previously covered by the mask, and the zinc layer 4 and the tin layer 5 are formed on the undercoat layer 3 at the parts except for the planned contact parts 25. Moreover, an oxide layer is thinly generated on the surface of the tin layer 5 of these films 8.

Then, the shape of the terminal shown in FIG. 3 is formed as it is the strip material by pressing or the like, and the connecting parts 23 are cut off so as to form into the anti-corrosion terminal 10.

FIG. 4 shows the end part structure in which the anti-corrosion terminal 10 is crimped on the electric wire 12; the vicinity of the core-crimping part 13 is directly in contact with the core 12a of the electric wire 12.

In this anti-corrosion terminal 10, since the tin layer 5 contains zinc having the nearer corrosion potential to that of aluminum than that of tin on the planned core contact parts 26, the corrosion potential of the tin layer 5 at the planned core contact parts 26 is near to that of aluminum. Accordingly, the effect of preventing corrosion of the core (aluminum wire material) 12a made of aluminum is high, so that it is possible to effectively prevent the contact corrosion between dissimilar metals, even in a state in which the planned core contact part 25 is crimped to the core 12a. In this case, since the plating and heat treatment were carried out in the state of the strip material in FIG. 2, the base material 2 is scarcely exposed except for small parts which were connected by the connecting parts 23 in end surfaces of the anti-corrosion terminal 10: accordingly, excellent corrosion-resistant effect can be shown.

Moreover, even if the tin layer 5 is entirely or partly disappeared by abrasion or the like, since the zinc layer 4 is formed under the tin layer 5, and since the zinc layer 4 has the corrosion potential near to that of aluminum, the contact corrosion of dissimilar metals can be certainly prevented from occurrence.

Meanwhile, on the second coating film 82 of the planned contact parts 25, it is possible to restrict the contact resistance from rising even when exposed in the high-temperature and high-humidity environment, since the zinc layer 4 is not provided under the tin layer 5.

The present invention is not limited to the above-described embodiment and various modifications may be made without departing from the scope of the present invention.

For example, in the above embodiment, the method not forming the zinc layer 4 on the planned contact parts 25 was applied, as carrying out zinc alloy plating while covering the planned contact parts 25 by the mask in the embodiment: however, a method is also applicable that zinc alloy plating is carried out on an entire surface including the planned contact parts 25, and the zinc alloy plating layer on the planned contact parts 25 is removed by partial etching.

Figure 5:
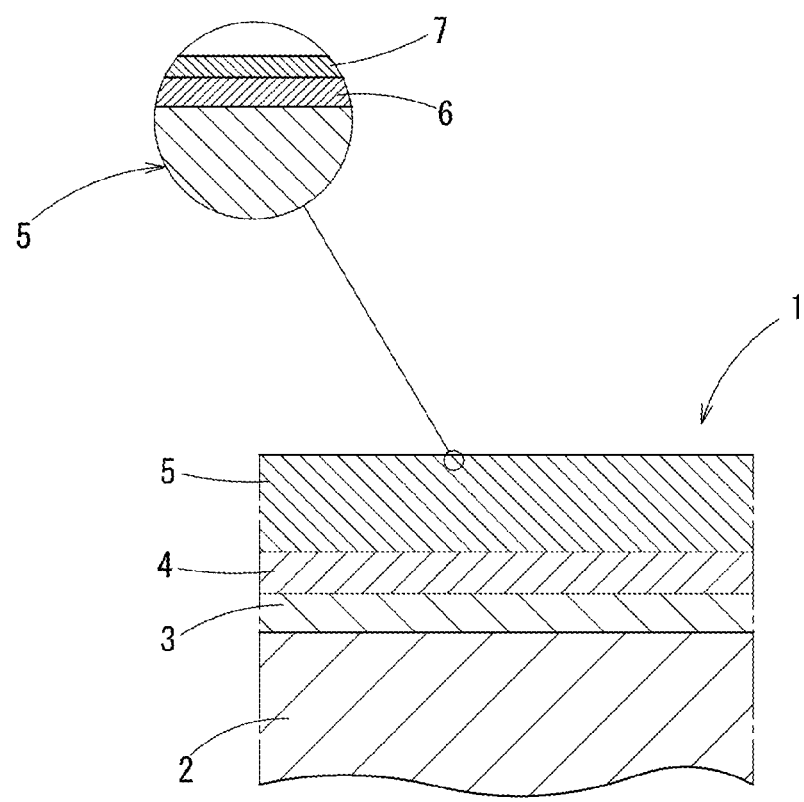
FIG. 5 It is a cross sectional view of an essential part schematically showing another embodiment of the present invention.

In the former embodiment, the outermost surface of the coating film 8 is formed of the tin layer 5: however, as shown in FIG. 5, a surface metal-zinc layer 6 may be formed on the tin layer 5 at parts except for the planned contact parts 25. The surface metal-zinc layer 6 is a layer formed on the surface of the tin layer 5 by diffusing zinc in the zinc alloy plating layer to the surface through the tin plating layer in the above-described heat treatment; it is different from the zinc layer 4 provided under the tin layer 5 and forming the first coating film 81. Accordingly, in the above-described area proportion of the zinc layer 4, a proportion of an area of this surface metal-zinc layer 6 is not included. Since the surface of the first coating film 81 is formed from the surface metal-zinc layer 6, it is reliably prevent the corrosion by the contact with the core 12a made of aluminum. In addition, an oxide layer 7 is generated thinly on the surface metal-zinc layer 6.

Besides the surface metal-zinc layer 6 is formed by diffusion from the zinc alloy plating layer, it can be formed by carrying out zinc plating on the surface of the tin layer 5. This zinc plating can be carried out by electroplating using known methods: for example, a zincate bath, a sulfate bath, a zinc chloride bath, and a cyanogen bath.

EXAMPLES

A copper board of C1020 was used as the base material; the strip material shown in FIG. 2 was punched out from this copper board, degreased and pickled, and nickel plated in a case of forming the undercoat layer was formed; and then zinc alloy plating was carried out except for the planned contact parts 25 in FIG. 2. Furthermore, after that, tin plating was carried out on the entire surface. Then, the heat treatment was carried out for this copper board with plating layers at temperature 30° C. to 190° C. for not less than 1 hour and not more than 36 hours, so that Samples 1 to 16 of the anti-corrosion terminal material shown in Table 1 were obtained.

Comparative Examples were manufactured as follows: for Sample 18, a zinc layer was formed at short time and low current density when zinc plating was carried out on the planned core contact part: for Sample 19, the zinc layer was formed on the planned contact part by carrying out zinc plating on the entire surface without covering the planned contact part: and for Sample 17, though zinc plating was not carried out either on parts the other than the planned contact part, after degreasing and pickling on the copper board, nickel plating and tin plating were carried out in order.

Principal plating conditions were as follows: the zinc concentration (zinc content percentage) of the zinc layer was adjusted by varying a ratio between zinc ions and additive metal element ions in plating solution. In addition, the content amounts of the additive metal elements were denoted by proportions (% by mass) in parentheses in final columns of the respective additive metal elements in TABLE 1.

The following zinc nickel alloy plating condition is an example in which the nickel content percentage is 15% by mass. In addition, nickel plating for the undercoat layer 3 was not carried out on Samples 1 to 13 and 17 to 19; on Samples 14 to 16, nickel plating was carried out so that the undercoat layer 3 was formed.

—Nickel Plating Condition—
Composition of Plating Bath
Nickel sulfamate: 300 g/L
Nickel chloride: 5 g/L
Boric acid: 30 g/L
    Bath Temperature: 45° C.
    Current Density: 5 A/dm$^2$
    —Zinc Plating Condition—
    Composition of Plating Bath
Zinc sulfate heptahydrate: 250 g/L
Sodium sulfate: 150 g/L
    pH=1.2
    Bathe Temperature: 45° C.
    Current Density: 5 A/dm$^2$
    —Zinc Nickel Alloy Plating Condition—
    Composition of Plating Bath
Zinc sulfate heptahydrate: 75 g/L
Nickel sulfate hexahydrate: 180 g/L
Sodium sulfate: 140 g/L
    pH=2.0
    Bath Temperature: 45° C.
    Current Density: 5 A/dm$^2$
    —Condition of Tin Zinc Alloy Plating—
    Composition of Plating Bath
Tin(II) sulfate: 40 g/L
Zinc sulfate heptahydrate: 5 g/L Trisodium citrate: 65 g/L
Nonionic surfactant: 1 g/L
  pH=5.0
  Bath Temperature: 25° C.
  Current Density: 3 A/dm$^2$
  —Zinc Manganese Alloy Plating Condition—
  Composition of Plating Bath
Manganese sulfate monohydrate: 110 g/L
Zinc sulfate heptahydrate: 50 g/L
Trisodium citrate: 250 g/L
  pH=5.3
  Bath Temperature: 30° C.
  Current Density: 5 A/dm$^2$
  —Zinc Molybdenum Alloy Plating Condition—
  Composition of Plating Bath
Hexaammonium heptamolybdate tetrahydrate: 1 g/L
Zinc sulfate heptahydrate: 250 g/L
Trisodium citrate: 250 g/L
  pH=5.3
  Bath Temperature: 30° C.
  Current Density: 5 A/dm$^2$
  —Tin Plating Condition—
  Composition of Plating Bath
Stannous methanesulfonate: 200 g/L
Methanesulfonic acid: 100 g/L
Gloss Agent
  Bath Temperature: 25° C.
  Current Density: 5 A/dm$^2$ As to the resulting Samples, respective thicknesses of the zinc layer and the tin layer, zinc concentration in the zinc layer and the tin layer, a mean crystal grain size of the tin layer and the area proportion of the zinc layer were measured.

The thickness of the zinc layer was measured by observing a cross section by a scanning ion microscope. The zinc concentration of the zinc layer was measured as follows: an observation piece with a thickness not more than 100 nm was formed, using a focused ion beam device made by Seiko Instrument Inc. (FIB: model No. SMI3050 TB): the observation piece was observed by a scanning transmission electron microscope made by JEOL Ltd. (STEM: model No. JEM-2010F) at an acceleration voltage 200 kV; and measured using an energy dispersive X-ray spectrometer (EDS made by Thermo) belonging to the STEM. The zinc concentration was obtained as a mean value of values measured at 5 points at even intervals in a film thickness direction.

The zinc concentration in the tin layer was measured at a surface of the sample using an electron probe micro analyzer (EPMA: model No. JXA-8530F) made by JEOL Ltd., at an acceleration voltage 6.5 kV and a beam diameter 30 μm.

As to the mean crystal grain size of tin and tin alloy in the tin layer, obtained as follows: cut-surface machining was carried out by the focused ion beam (FIB), a line was drawn with a length 5 μm parallel to the surface using a measured image of a scanning ion microscope (SIM), and it was found by linear analysis using a number at which the line crosses to crystal boundaries.

TABLE 1

| SAMPLE No. | UNDER-COAT LAYER EXISTENCE | PLANNED CORE CONTACT PART | | | | | | PLANNED CONTACT PART | | ZINC LAYER AREA PROPORTION (%) |
| | | TIN LAYER | | | ZINC LAYER | | | TIN LAYER | | |
| | | MEAN CRYSTAL GRAIN SIZE (μM) | ZINC CONCENTRATION (% by mass) | THICKNESS (μM) | ZINC CONCENTRATION (% by mass) | THICKNESS (μM) | ADDITIVE METAL ELEMENT (% by mass) | ZINC CONCENTRATION (% by mass) | ZINC LAYER EXISTENCE | |
| 1 | NO | 8.5 | 0.3 | 0.5 | 30 | 5.0 | Co(70) | 0 | NO | 10 |
| 2 | NO | 0.4 | 25.0 | 0.6 | 95 | 0.1 | Ni(5) | 0 | NO | 27 |
| 3 | NO | 0.4 | 20.0 | 7.0 | 90 | 0.3 | Fe(10) | 0 | NO | 22 |
| 4 | NO | 0.4 | 0.2 | 8.0 | 35 | 4.5 | Mn(65) | 0 | NO | 25 |
| 5 | NO | 10.0 | 0.3 | 0.3 | 40 | 4.0 | Mo(60) | 0 | NO | 28 |
| 6 | NO | 9.5 | 18.3 | 10.0 | 85 | 0.6 | Cd(15) | 0 | NO | 29 |
| 7 | NO | 0.3 | 16.0 | 0.7 | 45 | 3.2 | Pb(75) | 0 | NO | 18 |
| 8 | NO | 0.3 | 0.3 | 6.6 | 40 | 1.0 | Sn(60) | 0 | NO | 28 |
| 9 | NO | 9.0 | 21.2 | 9.0 | 60 | 0.8 | Ni(15), Sn(25) | 0 | NO | 30 |
| 10 | NO | 0.5 | 26.2 | 7.5 | 92 | 2.0 | Ni(18) | 0 | NO | 45 |
| 11 | NO | 8.0 | 0.1 | 6.5 | 32 | 0.5 | Sn(13), Co(55) | 0 | NO | 70 |
| 12 | NO | 1.0 | 15.0 | 0.8 | 82 | 1.5 | Ni(9), Sn(9) | 0 | NO | 60 |
| 13 | NO | 4.0 | 0.4 | 6.0 | 86 | 0.8 | Co(14) | 0 | NO | 50 |
| 14 | YES | 2.0 | 6.0 | 2.0 | 75 | 2.0 | Ni(19), Sn(6) | 0 | NO | 70 |
| 15 | YES | 3.0 | 12 | 3.0 | 66 | 0.8 | Ni(14), Sn(20) | 0 | NO | 55 |
| 16 | YES | 0.6 | 4.0 | 5.0 | 88 | 1.2 | Ni(10), Sn(2) | 0 | NO | 70 |
| 17 | NO | 3.0 | 0 | 2.0 | — | — | — | 0 | NO | 0 |
| 18 | NO | 0.2 | 0.2 | 8.0 | 25 | 0.05 | Ni(75) | 0 | NO | 20 |
| 19 | NO | 0.2 | 28.0 | 9.0 | 100 | 6.0 | — | 28 | YES | 100 |

The resulting Samples 1 to 19 were formed into female terminals of 090 type (a standard of terminals commonly used in automotive industry), and crimped to pure aluminum wire material: as to the respective terminals, measured were: contact resistance between the pure aluminum wire material and the female terminal after leaving in corrosive environment and after leaving in high-temperature and high-humidity environment; and contact resistance between the terminals when a male terminal was fit-connected to the female terminal after leaving in high-heat environment.

—Corrosive Environment Leaving Test—

The female terminal of 090 type crimped to the pure aluminum wire material was soaked in sodium chloride aqueous solution of 5% at 23° C. for 4 hours, then left under high-temperature and high-humidity, 85° C. and 85% RH for 24 hours. After that the contact resistance between the pure aluminum wire material and the terminal was measured by the four-terminal method. The current value was 10 mA.

—High-Temperature and High-Humidity Environment Test—

The female terminal of 090 type crimped to the pure aluminum wire material was left at 85° C. and 85% RH for 96 hours. Then, the contact resistance between the pure aluminum wire material and the terminal was measured by the four-terminal method. The current value was 10 mA.

—High-Heat Environment Leaving Test—

The female terminal of 090 type crimped to the pure aluminum wire was left in 150° C. for 500 hours. After that, the male terminal of 090 type having tin plating was fitted, and the contact resistance (a resistant value) between terminals was measured by the four-terminal method.

TABLE 2 shows these results.

TABLE 2

| SAMPLE No. | LEAVING IN CORROSIVE ENVIRONMENT (mΩ) | LEAVING IN HIGH-TEMPERATURE HGH-HUMIDITY ENVIRONMENT (mΩ) | LEAVING IN HIGH-HEAT ENVIRONMENT (mΩ) |
|---|---|---|---|
| 1 | 6.9 | 1.5 | 2.4 |
| 2 | 7.8 | 3.9 | 5.0 |
| 3 | 3.9 | 3.3 | 4.9 |
| 4 | 3.5 | 1.9 | 4.0 |
| 5 | 4.1 | 1.8 | 2.9 |
| 6 | 2.6 | 2.2 | 3.1 |
| 7 | 2.9 | 1.5 | 2.8 |
| 8 | 2.8 | 2.0 | 3.0 |
| 9 | 1.9 | 2.6 | 3.1 |
| 10 | 1.5 | 1.9 | 3.3 |
| 11 | 1.8 | 1.5 | 2.3 |
| 12 | 1.0 | 1.5 | 3.0 |
| 13 | 1.2 | 1.8 | 2.5 |
| 14 | 0.7 | 1.0 | 1.1 |
| 15 | 0.6 | 0.9 | 1.0 |
| 16 | 0.8 | 1.2 | 1.5 |
| 17 | not less than 2000 | 3.5 | 10.2 |
| 18 | 31 | 5.5 | 9.8 |
| 19 | 25 | 12 | 12 |

From the results in TABLE 2, it can be found that Samples 1 to 16 have higher corrosion-resistance property in comparison with Samples 17 to 19: in Samples 1 to 16, the zinc layer made of zinc alloy was formed at parts (the planned core contact parts) where the core (aluminum wire material) made of aluminum is in contact with; the zinc layer has thickness not less than 0.1 μm and not more than 5.0 μm and zinc concentration not less than 30% by mass and not more than 95% by mass. Samples 14 to 16 having the undercoat layer of nickel between the base material and the coating film have most excellent corrosion-resistance property among Samples 1 to 16.

Samples 9 to 16, which had the area proportion of the zinc layer to the surface after being formed as the terminal was not less than 30%, had lower resistance value after leaving test in the corrosive environment in comparison with Samples 1 to 8. Among these, Samples 10 to 16 in which the mean crystal grain size of tin or tin alloy in the tin layer at the planned core contact parts was in a range of not less than 0.5 μm and not more than 8.0 μm were controlled so that the crystal grain size of tin to be most optimal size: as a result, the diffusion amount of zinc to the tin layer was controlled to be most optimal, and the resistance value in the leaving test in the corrosive environment was more restricted from rising. Samples 12 to 16 are prevented from rising of the resistance value in the leaving test in the corrosive environment in comparison with Samples 1 to 11: in Samples 12 to 16, the tin layer at the planned core contact parts had the thickness not less than 0.8 μm and not more than 6.0 μm, and the zinc concentration not less than 0.4% by mass and not more than 15% by mass. Samples 14 to 16 in which the undercoat layer made of nickel or nickel alloy was formed between the base material and the zinc layer are prevented from rising of the resistance value after leaving in high-heat environment in comparison with the other Samples.

Compared to this, Sample 17 of the comparative example was not provided with the zinc layer at the planned core contact part, terrific corrosion was found in the leaving test in the corrosive environment and the resistance value was remarkably increased. In Sample 18, the resistance value was increased after the tests of leaving in the high-temperature and high-humidity environment, leaving in the high-heat environment and leaving in the corrosive environment; because the film thickness and the zinc concentration of the zinc layer on the planned core contact parts were not suitable. In Sample 19, the resistance value was increased after the tests of leaving in the high-temperature and high-humidity environment, leaving in the high-heat environment and leaving in the corrosive environment; because the zinc layer was provided at the planned contact parts and the film thickness and the zinc concentration in the zinc layer were not suitable.

INDUSTRIAL APPLICABILITY

It is possible to provide the anti-corrosion terminal material having high anti-corrosion effect using copper or copper alloy base material, the anti-corrosion terminal made of the anti-corrosion terminal material, and the electric wire end structure using the anti-corrosion terminal as a terminal which is crimped to the end of the electric wire made of aluminum wire material.

REFERENCE SIGNS LIST

1 Anti-corrosion terminal material
2 Base material
3 Undercoat layer
4 Zinc layer
5 Tin layer
6 Surface metal-zinc layer
7 Oxide layer
8 Coating film
81 First coating film
82 Second coating film
10 Anti-corrosion terminal
11 Coupling part
11a Spring tab
12 Electric wire
12a Core (Aluminum wire material)
12b Cover part
13 Core-crimping part
14 Cover-crimping part
25 Planned contact part
26 Planned core contact part

The invention claimed is:

1. An anti-corrosion terminal material comprising a base material made of copper or copper alloy and a coating film laminated on the base material, wherein the coating film comprises:
   a first coating film formed on a surface of a planned core contact part in which a core of an electric wire is in contact with when a terminal is formed and having a zinc layer made of zinc alloy and a tin layer made of tin or tin alloy which are laminated in this order; and
   a second coating film formed on a surface of the part except for a planned core contact comprising a tin layer, of the second coating film, made of tin or tin alloy but not comprising a zinc layer, and
   wherein the zinc layer, of the first coating film, has a thickness not less than 0.1 μm and not more than 5.0 μm and zinc concentration not less than 30% by mass and not more than 95% by mass, and has any one or more of nickel, iron, manganese, molybdenum, cobalt, cadmium, lead and tin as a balance.

2. The anti-corrosion terminal material according to claim 1, wherein a proportion of an area of the zinc layer, of the first coating film, to a surface after the terminal is formed is not less than 30% and not more than 80%.

3. The anti-corrosion terminal material according to claim 1, wherein a mean crystal grain size of tin or tin alloy in the tin layer of the first coating film is not less than 0.5 and not more than 8.0 μm.

4. The anti-corrosion terminal material according to claim 1, wherein at the planned core contact part, the tin layer of the first coating film has a thickness not less than 0.8 and not more than 6.0 μm and made of tin alloy having zinc concentration not less than 0.4% by mass and not more than 15% by mass.

5. The anti-corrosion terminal material according to claim 1, wherein an undercoat layer made of nickel or nickel alloy is provided between the base material and the coating film.

6. The anti-corrosion terminal material according to claim 1, comprising
   a carrier part having a belt-shape; and
   terminal members connected with an interval therebetween along a length direction of the carrier part and provided with the planned core contact part and the planned contact part.

7. An anti-corrosion terminal formed of the anti-corrosion terminal material according to claim 1.

8. An electric wire end structure wherein the anti-corrosion terminal according to claim 7 is crimped to an end of an electric wire formed of aluminum wire material made of aluminum or aluminum alloy.

9. The anti-corrosion terminal material according to claim 1, wherein the thickness of the zinc layer, of the first coating film, is not less than 0.3 μm and not more than 2.0 μm.

10. The anti-corrosion terminal material according to claim 1, wherein the zinc concentration of the zinc layer, of the first coating film, is not less than 65% by mass.

11. The anti-corrosion terminal material according to claim 1, wherein a total of any one or more of nickel, iron, manganese, molybdenum, cobalt, cadmium, lead and tin contained in the zinc layer, of the first coating film, is not less than 5% by mass.

12. The anti-corrosion terminal material according to claim 3, wherein a mean crystal grain size of tin or tin alloy in the tin layer, of the first coating film, is not less than 1.2 and not more than 3.0 μm.

13. The anti-corrosion terminal material according to claim 4, wherein the zinc concentration in the tin layer, of the first coating film, is not less than 0.6% by mas and not more than 6.0% by mass.

14. The anti-corrosion terminal material according to claim 5, wherein the zinc concentration in the tin layer, of the first coating film, is not less than 0.6% by mas and not more than 6.0% by mass.

15. The anti-corrosion terminal material according to claim 5, wherein a thickness of the undercoat layer is not less than 0.1 μm and not more than 5.0 μm.

16. The anti-corrosion terminal material according to claim 15, wherein a thickness of the undercoat layer is not less than 0.3 μm and not more than 2.0 μm.

17. The anti-corrosion terminal material according to claim 5, wherein a nickel content percentage in the undercoat layer is not less than 80% by mass.

18. The anti-corrosion terminal material according to claim 17, wherein the nickel content percentage is not less than 90% by mass.

19. The anti-corrosion terminal according to claim 7, provided with:
   a core-crimping part to which a core of an electric wire is crimped, a cover-crimping part to which a cover part of the electric wire is crimped, and a coupling part to which another terminal is connected.

* * * * *